(12) United States Patent
Mennecke et al.

(10) Patent No.: US 12,331,223 B2
(45) Date of Patent: Jun. 17, 2025

(54) TWO-COMPONENT COMPOSITION WITH A HIGH DEGREE OF STRENGTH

(71) Applicant: SIKA TECHNOLOGY AG, Baar (CH)

(72) Inventors: Klaas Mennecke, Lottstetten (DE); Fabien Choffat, Rüttenen (CH); Ursula Stadelmann, Zürich (CH)

(73) Assignee: SIKA TECHNOLOGY AG, Baar (CH)

(*) Notice: Subject to any disclaimer, the term of this patent is extended or adjusted under 35 U.S.C. 154(b) by 689 days.

(21) Appl. No.: 17/441,635

(22) PCT Filed: May 28, 2020

(86) PCT No.: PCT/EP2020/064860
§ 371 (c)(1),
(2) Date: Sep. 21, 2021

(87) PCT Pub. No.: WO2020/239918
PCT Pub. Date: Dec. 3, 2020

(65) Prior Publication Data
US 2022/0145144 A1  May 12, 2022

(30) Foreign Application Priority Data
May 28, 2019 (EP) .................................. 19177084

(51) Int. Cl.
| | | |
|---|---|---|
| *C09J 163/00* | (2006.01) | |
| *C08G 18/10* | (2006.01) | |
| *C08G 18/28* | (2006.01) | |
| *C08G 18/48* | (2006.01) | |
| *C08G 18/75* | (2006.01) | |
| *C08G 18/76* | (2006.01) | |
| *C08G 59/22* | (2006.01) | |
| *C08G 59/24* | (2006.01) | |
| *C08G 59/50* | (2006.01) | |
| *C08G 59/62* | (2006.01) | |
| *C08L 63/00* | (2006.01) | |
| *C08L 75/08* | (2006.01) | |
| *C09D 163/00* | (2006.01) | |
| *C09J 175/08* | (2006.01) | |

(52) U.S. Cl.
CPC .......... *C09J 163/00* (2013.01); *C08G 18/289* (2013.01); *C08G 18/4825* (2013.01); *C08G 18/4845* (2013.01); *C08G 18/755* (2013.01); *C08G 18/7621* (2013.01); *C08G 18/7671* (2013.01); *C08G 59/226* (2013.01); *C08G 59/245* (2013.01); *C08G 59/5026* (2013.01); *C08G 59/623* (2013.01); *C08L 63/00* (2013.01); *C09D 163/00* (2013.01); *C09J 2463/00* (2013.01); *C09J 2475/00* (2013.01)

(58) Field of Classification Search
None
See application file for complete search history.

(56) References Cited

U.S. PATENT DOCUMENTS

| | | |
|---|---|---|
| 6,737,482 B1 | 5/2004 | Ando et al. |
| 2003/0092867 A1 | 5/2003 | Sato et al. |
| 2014/0179830 A1* | 6/2014 | Burckhardt ............ C09J 175/12 523/425 |
| 2017/0292050 A1* | 10/2017 | Burckhardt ............ C08L 75/08 |

FOREIGN PATENT DOCUMENTS

| | | |
|---|---|---|
| EP | 0370464 A2 | 5/1990 |
| EP | 2562223 A1 | 2/2013 |
| JP | S61-247723 A | 11/1986 |
| JP | S61-268720 A | 11/1986 |
| JP | 2004-231880 A | 8/2004 |
| JP | 2009-173919 A | 8/2009 |
| JP | 2011-12144 A | 1/2011 |
| JP | 2014-529650 A | 11/2014 |
| WO | 2017/140688 A1 | 8/2017 |

OTHER PUBLICATIONS

Sep. 3, 2020 International Search Report isssued in International Patent Application No. PCT/EP2020/064860.
Sep. 3, 2020 Written Opinion issued in International Patent Application No. PCT/EP2020/064860.
Nov. 16, 2021 International Preliminary Report on Patentability issued in International Patent Application No. PCT/EP2020/064860.

* cited by examiner

*Primary Examiner* — Ha S Nguyen
(74) *Attorney, Agent, or Firm* — Oliff PLC

(57) ABSTRACT

A composition including: —at least one silane group-containing polymer with a silicon content ranging from 0.6 to 2 wt. %, obtained by reacting at least one isocyanate group-containing polymer and at least one amino-, mercapto-, or hydroxysilane, —at least one liquid epoxy resin, and—at least one polyamine with at least three amine hydrogens which are reactive towards epoxy groups. The composition facilitates adhesives, coatings, or sealing compounds with a good storage stability, a fast curing time, even in the event of moisture or humidity, a surprisingly high degree of strength while having a high degree of elasticity, a high degree of resistance against further tearing, a high degree of resistance in particular against glycol/water mixtures, and a high degree of adhesion to many substrates. When used on metals such as steel or aluminum, the composition protects same against corrosion.

14 Claims, No Drawings

TWO-COMPONENT COMPOSITION WITH A HIGH DEGREE OF STRENGTH

TECHNICAL FIELD

The invention relates to compositions that are curable at room temperature and are based on a combination of polymer containing silane groups and epoxy resin, and to the use thereof, especially as a viscoelastic adhesive, coating or casting compound having high strength, extensibility and stability.

STATE OF THE ART

Adhesives, casting compounds and coatings based on polyurethanes or epoxy resins are known and have various uses. Polyurethane-based materials have high extensibility, but are limited in terms of the strengths achievable. Moreover, they are prone to damage when used in a wet or moist environment and show weaknesses in stability toward glycol/water mixtures, as used, for example, as cooling fluid for batteries in electrical vehicles, and in adhesion to metals under corrosive conditions. Epoxy resin-based materials enable very high strengths, bonding forces and stabilities, but are limited in terms of extensibility and show weaknesses in adhesion to aluminum under corrosive conditions, as in the case of saltwater stress.

Also known are materials that combine silane-functional polymers with epoxy resins. This achieves much higher strengths than with the silane-functional polymer alone. Such compositions based on what are called MS polymers, as commercially available from Kaneka, are known. These are silane-functional polymers from the hydrosilylation of polyols having allyl ether end groups. Such compositions are described, for example, in EP 370'464 or U.S. Pat. No. 6,737,482. With the combination of MS polymers and epoxy resins, however, only very limited strengths are achievable.

Also known are compositions comprising epoxy resins and silane-functional polymers from the reaction of polyols with isocyanatosilanes or from the reaction of polyols with diisocyanates to give isocyanate-functional polymers that are then reacted further with aminosilanes to give silane-functional polymers. Such systems are described, for example, in US 2017/0292050 or WO 2017/140688. The highest strengths are achieved with silane-functional polymers derived from polymers containing isocyanate groups and aminosilanes. The polymers containing silane groups that are used here are derived from long-chain polyether diols having an average molecular weight $M_n$ of about 12'000 g/mol, and accordingly have a low content of silane groups.

For certain applications, however, distinctly higher strengths are desirable, in combination with high bond forces, high tear resistance and high stabilities, for example for the bonding of battery boxes of electrical vehicles. Particular requirements there are a high stability of the bonds to aluminum substrates under corrosive conditions, such as saltwater stress in particular, and a high stability toward glycol/water mixtures, which is difficult to achieve for adhesives based on acrylates, polyurethanes and/or epoxy resins.

SUMMARY OF THE INVENTION

It is therefore an object of the present invention to provide a composition that cures rapidly and reliably at room temperature, even under wet or moist conditions, and enables high strengths coupled with high extensibility, high bonding forces, good stabilities, especially toward glycol/water mixtures, and corrosion-resistant adhesion to metals.

This object is surprisingly achieved by a composition as described in claim 1. The composition comprises at least one polymer containing silane groups and having a silicon content in the range from 0.6% to 2% by weight, obtained from the reaction of at least one polymer containing isocyanate groups and at least one amino-, mercapto- or hydroxysilane. In the prior art, such a polymer has not been implemented in combination with epoxy resins to date. Compared to corresponding compositions comprising a polymer containing silane groups and having a lower silicon content, as known from the prior art, the compositions of the invention surprisingly show massively higher strength coupled with similarly high extensibility, much higher tear resistance and excellent bonding forces, especially on metals under corrosive conditions, coupled with excellent stability to hydrolysis and glycol/water mixtures.

The composition of the invention enables adhesives, coatings or casting compounds having good storage stability as two-component products that cure rapidly and largely odorlessly after mixing, even in the presence of water or moisture, and form materials of surprisingly high strength coupled with high extensibility, high tear resistance and high stability, especially toward glycol/water mixtures, and having very high bonding forces on many substrates, including on moist or wet substrates, wherein the composition, when used on metals such as steel or aluminum, can protect these from corrosion.

More particularly, the composition enables viscoelastic adhesives with which metals, especially aluminum, can be bonded without pretreatment, such that the bond is stable under corrosive conditions, as in the case of saltwater stress in particular. Furthermore, the composition enables coatings with which metals such as steel or aluminum can be protected from corrosion. And finally, the composition enables casting compounds with which cracks in concrete, asphalt or bitumen can be permanently filled and hence repaired, wherein excellent adhesion arises even on a wet substrate. It is thus possible in a simple manner to permanently repair busy roads or squares with damage on their surface or at curbs, edges or boundaries. Finally, these products are free of isocyanates on processing, which is advantageous for toxicological reasons.

Further aspects of the invention are the subject of further independent claims. Particularly preferred embodiments of the invention are the subject of the dependent claims.

Ways of Executing the Invention

The invention provides a composition comprising
- at least one polymer containing silane groups and having a silicon content in the range from 0.6% to 2% by weight, obtained from the reaction of at least one polymer containing isocyanate groups and at least one amino-, mercapto- or hydroxysilane,
- at least one liquid epoxy resin, and
- at least one polyamine having at least three amine hydrogens reactive toward epoxy groups.

In the present document, the term "alkoxysilane group" or "silane group" for short refers to a silyl group which is bonded to an organic radical and has one to three, especially two or three, hydrolyzable alkoxy radicals on the silicon atom.

Correspondingly, the term "organosilane" or "silane" for short refers to an organic compound which contains at least one silane group.

"Aminosilane", "mercaptosilane" or "hydroxysilane" refer respectively to organosilanes having an amino, mercapto or hydroxyl group on the organic radical in addition to the silane group.

The "silicon content" of a polymer containing silane groups refers to the silicon content of the polymer in % by weight based on 100% by weight of polymer.

Dilution of the polymer with solvent or plasticizer is not counted here as part of the polymer. Likewise not counted as part of the silicon content of a polymer containing silane groups are silane-functional additives, for example adhesion-promoting organosilanes that may optionally additionally be present in the composition. Such substances are not considered to be polymers containing silane groups in the context of the invention.

The "NCO content" of a polymer refers to the polymer's content of isocyanate groups in % by weight.

An "aromatic" isocyanate group refers to one bonded directly to an aromatic carbon atom.

Substance names beginning with "poly", such as polyamine or polyol, refer to substances containing, in a formal sense, two or more of the functional groups that occur in their name per molecule.

"Amine hydrogen" refers to the hydrogen atoms of primary and secondary amino groups.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is determined by means of gel permeation chromatography (GPC) against polystyrene as standard, especially with tetrahydrofuran as mobile phase and refractive index detector.

A "storage-stable" or "storable" substance or composition is one that can be stored at room temperature in a suitable container over a prolonged period, typically over at least 3 months up to 6 months or more, without this storage resulting in any change in its application or use properties to an extent relevant to its use.

"Room temperature" refers to a temperature of 23° C.

All industry standards and norms mentioned in this document relate to the versions valid at the date of first filing.

Percentages by weight (% by weight or wt %) refer to proportions by mass of a constituent of a polymer or composition, based on the overall polymer or the overall composition, unless stated otherwise. The terms "mass" and "weight" are used synonymously in the present document.

A dashed line in the formulae in this document in each case represents the bond between a substituent and the associated molecular radical.

The polymer containing silane groups is preferably liquid at room temperature.

The polymer containing silane groups preferably has an average of 1.3 to 4, more preferably 1.5 to 3, especially 1.7 to 2.8, silane groups per molecule. The polymer containing silane groups most preferably has an average of 1.7 to 2.3 silane groups per molecule.

The polymer containing silane groups preferably has a silicon content in the range from 0.7% to 1.5% by weight, especially 0.8% to 1.2% by weight. Such a composition enables a particularly advantageous combination of high strength and high extensibility.

The polymer containing silane groups preferably has an average molecular weight $M_n$ in the range from 2'000 to 10'000 g/mol, more preferably 3'000 to 8'000 g/mol, especially 4'000 to 7'000 g/mol.

The polymer containing silane groups preferably has mainly polyoxyalkylene units, especially polyoxypropylene units.

The polymer containing silane groups preferably has silane groups of the formula (I)

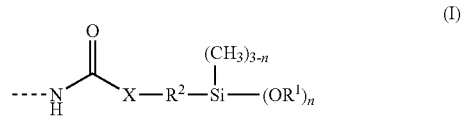

where
n is 1 or 2 or 3, especially 2 or 3,
$R^1$ is a linear or branched, monovalent hydrocarbyl radical having 1 to 5 carbon atoms,
$R^2$ is a linear or branched, divalent hydrocarbyl radical which has 1 to 12 carbon atoms and which optionally contains cyclic and/or aromatic moieties and optionally one or more heteroatoms, especially an amido, carbamate or morpholino group,
X is O or S or $NR^3$ where $R^3$ is a hydrogen atom or a linear or branched hydrocarbyl radical which has 1 to 20 carbon atoms and which optionally contains cyclic moieties, and which optionally contains an alkoxysilyl group or ether or carboxylic ester groups.

Preferably, n is 3. Such a composition cures particularly rapidly and enables particularly high strengths.

Preferably, $R^1$ is methyl or ethyl or isopropyl.

More preferably, $R^1$ is methyl. Polymers of this kind containing silane groups are particularly reactive.

More preferably, moreover, $R^1$ is ethyl. Polymers of this kind containing silane groups are particularly stable on storage and toxicologically advantageous.

Preferably, X is O or $NR^3$.

Preferably, $R^3$ is H, butyl, phenyl or a branched aliphatic radical which has 6 to 20 carbon atoms and optionally has ether or carboxylic ester groups.

Most preferably, X is $NR^3$ and $R^3$ is

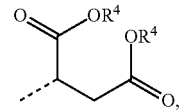

where each $R^4$ is methyl or ethyl, especially ethyl. Such polymers containing silane groups are easily obtainable and enable particularly high strengths coupled with high extensibility and stability.

In the case that X=$NR^3$, $R^2$ is preferably 1,3-propylene or 1,4-butylene, where butylene may be substituted by one or two methyl groups, more preferably 1,3-propylene.

In the case that X=O, $R^2$ is preferably a divalent hydrocarbyl radical which has 6 to 12 carbon atoms and has an amido, carbamate or morpholino group, especially a radical of the formula

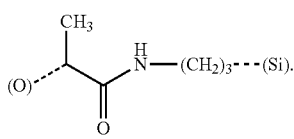

The preferred polymers containing silane groups enable compositions having a particularly attractive combination of high strength coupled with high extensibility.

The polymer containing silane groups is obtained from the reaction of at least one polymer containing isocyanate groups and at least one amino-, mercapto- or hydroxysilane.

The polymer containing isocyanate groups preferably has an NCO content in the range from 1.2% to 4% by weight, especially 1.2% to 2.8% by weight. Such a polymer containing isocyanate groups enables a silane group content of the invention on reaction with the preferred silanes.

The polymer containing isocyanate groups is in turn especially obtained from the reaction of at least one polyol and at least one diisocyanate.

The reaction is preferably conducted with exclusion of moisture at a temperature in the range from 20 to 160° C., especially 40 to 140° C., optionally in the presence of suitable catalysts.

The molar NCO/OH ratio is preferably in the range from 1.3/1 to 2.5/1.

Suitable polyols for the preparation of the polymer containing isocyanate groups are polyols that are liquid at room temperature, especially the following commercially available polyols or any mixtures thereof:

polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may be polymerized with the aid of a starter molecule having two or three active hydrogen atoms, especially a starter molecule such as water, ammonia or a compound having multiple OH or NH groups, for example ethane-1,2-diol, propane-1,2- or -1,3-diol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, cyclohexane-1,3- or -1,4-dimethanol, bisphenol A, hydrogenated bisphenol A, 1,1,1-trimethylolethane, 1,1,1-trimethylolpropane, glycerol or aniline, or mixtures of the aforementioned compounds.

Preferred polyether polyols are polyoxypropylene diols or polyoxypropylene triols, or what are called ethylene oxide-terminated (EO-capped) polyoxypropylene diols or triols. The latter are polyoxyethylene/polyoxypropylene copolyols which are obtained especially by further alkoxylating polyoxypropylene diols or triols with ethylene oxide on conclusion of the polypropoxylation reaction, with the result that they have primary hydroxyl groups.

Preferred polyether polyols have a level of unsaturation of less than 0.02 meq/g, especially less than 0.01 meq/g.

Polyether polyester polyols.

Polyacrylate polyols and polymethacrylate polyols.

Polyacrylate or polymethacrylate polyols.

Polyhydroxy-functional fats or oils, for example natural fats and oils, especially castor oil, or polyols obtained by chemical modification of natural fats and oils—called oleochemical polyols.

Polyhydrocarbon polyols, also called oligohydrocarbonols, such as, in particular, polyhydroxy-functional polyolefins, polyisobutylenes, polyisoprenes; polyhydroxy-functional ethylene/propylene, ethylene/butylene or ethylene/propylene/diene copolymers, as produced, for example, by Kraton Polymers; polyhydroxy-functional polymers of dienes, especially of 1,3-butadiene, which can especially also be prepared from anionic polymerization; polyhydroxy-functional copolymers of dienes, such as 1,3-butadiene, or diene mixtures and vinyl monomers, such as styrene, acrylonitrile, vinyl chloride, vinyl acetate, vinyl alcohol, isobutylene or isoprene, especially polyhydroxy-functional acrylonitrile/butadiene copolymers, as can be prepared, especially, from epoxides or amino alcohols and carboxyl-terminated acrylonitrile/butadiene copolymers (commercially available, for example, under the Hypro® CTBN or CTBNX or ETBN name from Emerald Performance Materials); or hydrogenated polyhydroxy-functional polymers or copolymers of dienes.

Preference is given to polyether polyols, especially polyoxyalkylene di- or triols. Particular preference is given to polyoxypropylene diols or polyoxypropylene triols optionally having terminal oxyethylene groups.

Preference is given to polyols having an average OH functionality in the range from 1.6 to 3, especially diols having an average OH functionality in the range from 1.8 to 2.

Preference is given to polyols, especially diols, having an average molecular weight $M_n$ in the range from 1'000 to 8'000 g/mol, especially 2'000 to 6'000 g/mol, more preferably 3'000 to 5'000 g/mol.

In the preparation of a polymer containing isocyanate groups, it is also possible to include proportions of di- or polyfunctional alcohols.

The polymer containing isocyanate groups is preferably obtained from the reaction of at least one polyoxypropylene diol having an OH number in the range from 18 to 58 mg KOH/g, especially 22 to 40 mg KOH/g, and optionally having terminal oxyethylene groups, and at least one diisocyanate.

At least one further polyol is optionally included in the preparation of the polymer containing isocyanate groups, especially a polyoxypropylene triol optionally having terminal oxyethylene groups.

Suitable diisocyanates for the preparation of the polymer containing isocyanate groups are diisocyanates having aliphatic isocyanate groups, especially hexane 1,6-diisocyanate (HDI), 2,2(4),4-trimethylhexamethylene 1,6-diisocyanate (TMDI), cyclohexane 1,3- or 1,4-diisocyanate, 1-isocyanato-3,3,5-trimethyl-5-isocyanatomethylcyclohexane (isophorone diisocyanate or IPDI), perhydro(diphenylmethane 2,4'- or 4,4'-diisocyanate) (HMDI), 1,3- or 1,4-bis(isocyanatomethyl)cyclohexane or m- or p-xylylene diisocyanate (XDI).

For the preparation of the polymer containing isocyanate groups, preference is given to diisocyanates having aromatic isocyanate groups, especially diphenylmethane 4,4'-diisocyanate, optionally with fractions of diphenylmethane 2,4'- and/or 2,2'-diisocyanate (MDI), tolylene 2,4-diisocyanate or mixtures thereof with tolylene 2,6-diisocyanate (TDI), phenylene 1,4-diisocyanate (PDI) or naphthalene 1,5-diisocyanate (NDI), and mixtures of the diisocyanates mentioned. Preference is given to HDI, IPDI, MDI or TDI, especially IPDI, MDI or TDI, most preferably MDI or TDI.

In a preferred embodiment of the invention, the polymer containing isocyanate groups has aromatic isocyanate groups. A polymer containing silane groups obtained therewith enables inexpensive compositions having particularly high strength.

More particularly, the aromatic isocyanate groups are derived from diphenylmethane 4,4'-diisocyanate, optionally with fractions of diphenylmethane 2,4'- and/or 2,2'-diisocyanate (MDI), or tolylene 2,4-diisocyanate or mixtures thereof with tolylene 2,6-diisocyanate (TDI).

The diisocyanate is thus more preferably selected from the group consisting of diphenylmethane 4,4'-diisocyanate, diphenylmethane 2,4'-diisocyanate, tolylene 2,4-diisocyanate and tolylene 2,6-diisocyanate.

The amino- or mercapto- or hydroxysilane for the reaction with the polymer containing isocyanate groups preferably has the formula (II)

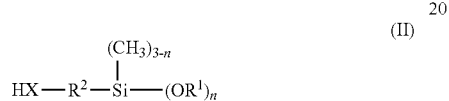

(II)

where n, $R^1$, $R^2$ and X have the definitions already given.

Suitable aminosilanes for the reaction with the polymer containing isocyanate groups are primary or secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary aminosilanes such as 3-aminopropyltrimethoxysilane, 3-aminopropyldimethoxymethylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially diethyl N-(3-trimethoxysilylpropyl)aminosuccinate or diethyl N-(3-dimethoxymethylsilylpropyl)aminosuccinate. Likewise suitable are analogs of the recited aminosilanes with ethoxy groups in place of the methoxy groups on the silicon.

Suitable mercaptosilanes for the reaction with the polymer containing isocyanate groups are especially 3-mercaptopropyltrimethoxysilane, 3-mercaptopropyldimethoxymethylsilane or analogs of these mercaptosilanes having ethoxy groups in place of the methoxy groups on the silicon.

Suitable hydroxysilanes for the reaction with the polymer containing isocyanate groups are especially obtainable from the addition of aminosilanes onto lactones, lactides or onto cyclic carbonates.

Preferred hydroxysilanes of this kind are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide or N-(3-triethoxysilylpropyl)-2-hydroxypropyl carbamate.

Further suitable hydroxysilanes are obtainable from the addition of aminosilanes onto epoxides or from the addition of amines onto epoxysilanes.

Preferred hydroxysilanes of this kind are 2-morpholino-4(5)-(2-trimethoxysilylethyl)cyclohexan-1-ol, 2-morpholino-4(5)-(2-triethoxysilylethyl)cyclohexan-1-ol or 1-morpholino-3-(3-(triethoxysilyl)propoxy)propan-2-ol.

Most preferred for the reaction with the polymer containing isocyanate groups is an aminosilane, especially diethyl N-(3-trimethoxysilylpropyl)aminosuccinate, diethyl N-(3-dimethoxymethylsilylpropyl)aminosuccinate or diethyl N-(3-triethoxysilylpropyl)aminosuccinate.

The composition further comprises at least one liquid epoxy resin.

Suitable liquid epoxy resin comprises customary technical epoxy resins which are free-flowing at room temperature and have a glass transition temperature of below 25° C. They are obtained in a known way, more particularly from the glycidylation of compounds having at least two active hydrogen atoms, more particularly polyphenols, polyols or amines, through reaction with epichlorohydrin.

Suitable liquid epoxy resins are especially aromatic liquid epoxy resins, especially the glycidylation products of:
- bisphenol A, bisphenol F or bisphenol A/F, where A stands for acetone and F for formaldehyde, which served as reactants for the preparation of these bisphenols. In the case of bisphenol F, positional isomers may also be present, especially derived from 2,4'- or 2,2'-hydroxyphenylmethane.
- dihydroxybenzene derivatives such as resorcinol, hydroquinone or catechol;
- further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;
- condensation products of phenols with formaldehyde that are obtained under acidic conditions, such as phenol novolaks or cresol novolaks, also called bisphenol F novolaks;
- aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable liquid epoxy resins are aliphatic or cycloaliphatic polyepoxides, especially
- glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;

a hydrogenated bisphenol A, F or A/F liquid resin, or the glycidylation products of hydrogenated bisphenol A, F or NF;

an N-glycidyl derivative of amides or heterocyclic nitrogen bases, such as triglycidyl cyanurate or triglycidyl isocyanurate, or reaction products of epichlorohydrin with hydantoin.

epoxy resins from the oxidation of olefins such as, in particular, vinylcyclohexene, dicyclopentadiene, cyclohexadiene, cyclododecadiene, cyclododecatriene, isoprene, 1,5-hexadiene, butadiene, polybutadiene or divinylbenzene.

A liquid epoxy resin based on a bisphenol is preferred.

Particularly preferred is a liquid epoxy resin based on a diglycidyl ether of bisphenol A, bisphenol F or bisphenol NF, as are commercially available, for example, from Dow, Huntsman or Momentive. These liquid epoxy resins have readily manageable viscosity and enable high strengths and resistances. Such liquid resins may also include fractions of solid bisphenol A resin or phenol novolaks.

The weight ratio in the composition between polymer containing silane groups and liquid epoxy resin is preferably in the range from 20/80 to 70/30, especially 25/75 to 50/50. A composition of this kind exhibits high strength in conjunction with good extensibility.

The composition further comprises at least one polyamine having at least three amine hydrogens reactive toward epoxy groups.

Suitable polyamines are especially as follows:

aliphatic, cycloaliphatic or arylaliphatic primary diamines, especially 2,2-dimethylpropane-1,3-diamine, pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2(4),4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, 1,2-, 1,3- or 1,4-diaminocyclohexane, 1,3-bis(aminomethyl)cyclohexane, 1,4-bis(aminomethyl)cyclohexane, 1-amino-3-aminomethyl-3,5,5-trimethylcyclohexane (isophoronediamine or IPDA), 2(4)-methyl-1,3-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), menthane-1,8-diamine, 1,3-bis(aminomethyl)benzene (MXDA) or 1,4-bis(aminomethyl)benzene;

aliphatic primary di- or triamines containing ether groups, especially 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, 3,9-bis(3-aminopropyl)-2,4,8,10-tetraoxaspiro[5.5]undecane, cycloaliphatic diamines containing ether groups from the propoxylation and subsequent amination of 1,4-dimethylolcyclohexane, available in particular as Jeffamine® RFD-270 (from Huntsman), or polyoxyalkylenediamine or polyoxyalkylenetriamine, especially Jeffamine® D-230, Jeffamine® D-400, Jeffamine® D-2000, Jeffamine® EDR-104, Jeffamine® EDR-148, Jeffamine® EDR-176, Jeffamine® T-403, Jeffamine® T-3000, Jeffamine® T-5000 (all from Huntsman), or corresponding amines from BASF or Nitroil;

polyamines having secondary amino groups and having two primary amino groups, such as, in particular, 3-(2-aminoethyl)aminopropylamine, bis(hexamethylene)triamine (BHMT), diethylenetriamine (DETA), triethylenetetramine (TETA), tetraethylenepentamine (TEPA), pentaethylenehexamine (PEHA) or higher homologs of linear polyethyleneamines, dipropylenetriamine (DPTA), N-(2-aminoethyl)propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine or N,N'-bis(3-amino-1-ethylpropyl)-2-methylpentane-1,5-diamine;

polyamines having tertiary amino groups, such as, in particular, 2-aminoethylpiperazine, 3-dimethylaminopropylamine (DMAPA), N,N-dimethyldi(1,3-propylene)triamine (DMAPAPA), N,N'-bis(aminoethyl)piperazine, N,N'-bis(aminopropyl)piperazine, N,N-bis(3-aminopropyl)methylamine, N,N-bis(3-aminopropyl)ethylamine;

aliphatic, cycloaliphatic or arylaliphatic primary triamines, especially 4-aminomethyloctane-1,8-diamine, 1,3,5-tris(aminomethyl)benzene, 1,3,5-tris(aminomethyl)cyclohexane, tris(2-aminoethyl)amine, tris(2-aminopropyl)amine or tris(3-aminopropyl)amine; or diamines having one primary and one secondary amino group, especially products from the reductive alkylation of primary aliphatic polyamines with aldehydes or ketones, such as, in particular, N-benzylethane-1,2-diamine, N-benzylpropane-1,2-diamine, N-benzyl-1,3-bis(aminomethyl)benzene, N-2-ethylhexyl-1,3-bis(aminomethyl)benzene, N-(2-phenylethyl)-1,3-bis(aminomethyl)benzene (constituent of styrenized 1,3-bis(aminomethyl)benzene, available as Gaskamine® 240 from Mitsubishi Gas Chemical); or adducts of the recited amines or of small amines such as, in particular, ethane-1,2-diamine or propane-1,2-diamine with mono- or diepoxides, especially with cresyl glycidyl ether or bisphenol A diglycidyl ether; or polyamidoamines, especially reaction products of a mono- or polybasic carboxylic acid, or the ester or anhydride thereof, especially a dimerized fatty acid, with a polyamine used in stoichiometric excess, especially a polyalkyleneamine such as DETA or TETA, for example; or Mannich bases, especially phenalkamines, i.e. reaction products of phenols, especially cardanol, with aldehydes, especially formaldehyde, and polyamines.

Preference is given to aliphatic, cycloaliphatic or arylaliphatic polyamines.

Preference is given to polyamines selected from the group consisting of MPMD, TMD, 1,2-diaminocyclohexane, 1,3-diaminocyclohexane, 1,4-diaminocyclohexane, 1,3-bis(aminomethyl)cyclohexane, 1,4-bis(aminomethyl)cyclohexane, IPDA, 2(4)-methyl-1,3-diaminocyclohexane, bis(4-aminocyclohexyl)methane, NBDA, MXDA, polyoxypropylenediamines and polyoxypropylenetriamines having average molecular weight $M_n$ in the range from 200 to 500 g/mol, BHMT, TETA, TEPA, N4 amine, DMAPAPA, N-benzylethane-1,2-diamine, N-benzylpropane-1,2-diamine, N-benzyl-1,3-bis(aminomethyl)benzene, N-(2-phenylethyl)-1,3-bis(aminomethyl)benzene and the adduct of MPMD or propane-1,2-diamine with cresyl glycidyl ether.

Among these, particular preference is given to 1,2-diaminocyclohexane. This gives particularly high strengths.

Among these, particular preference is also given to IPDA. This gives particularly inexpensive compositions having high strength.

Among these, particular preference is also given to polyoxypropylenedi- or -triamines having average molecular weight $M_n$ in the range from 200 to 500 g/mol, especially Jeffamine® D-230, Jeffamine® D-400 or Jeffamine® T-403. These give particularly high stretching.

Among these, particular preference is also given to the adduct of propane-1,2-diamine with cresyl glycidyl ether, especially ortho-cresyl glycidyl ether, where the adduct is preferably formed with an excess of propane-1,2-diamine over the cresyl glycidyl ether and the non-adducted propane-1,2-diamine is removed by means of distillation after the reaction. This gives shiny surfaces even under most conditions.

It may be advantageous to use a mixture of two or more polyamines. Preference is given to mixtures comprising at least one polyoxypropylenedi- or -triamine and at least one further polyamine.

The polyamine or mixture of two or more polyamines is preferably present in such an amount that the ratio of the number of amine hydrogens to the number of epoxy groups is in the range from 0.5/1 to 1.5/1, especially 0.8/1 to 1.2/1.

The composition of the invention is preferably a two-component composition and comprises a first component and a second component that are produced, packed and stored separately, wherein the polyamine is not in the same component as the liquid epoxy resin.

In a preferred embodiment of the invention, the composition comprises a first component comprising
at least one polymer containing silane groups, as described above, and
at least one liquid epoxy resin, and a second component comprising
at least one polyamine having at least three amine hydrogens reactive toward epoxy groups.

In a further preferred embodiment of the invention, the composition comprises a first component comprising
at least one polymer containing silane groups, as described above, and
at least one polyamine having at least three amine hydrogens reactive toward epoxy groups, and a second component comprising
at least one liquid epoxy resin.

With both of these embodiments, the components on their own are each stable on storage in the absence of moisture. When the two components are mixed, primary and/or secondary amino groups react with epoxide groups that are present. Silane groups react and release alcohol when they come into contact with water.

The composition preferably additionally comprises at least one further constituent selected from aminosilanes, driers, accelerators, water, fillers and plasticizers.

Suitable aminosilanes are especially 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, and analogs thereof with ethoxy groups in place of the methoxy groups on the silicon.

The aminosilane is suitably in the same component as the polyamine.

The composition preferably contains aminosilane in an amount in the range from 0.1% to 5% by weight, especially in the range from 0.2% to 2% by weight. Such compositions have particularly high strength.

Suitable driers are especially tetraethoxysilane, vinyltrimethoxysilane, vinyltriethoxysilane, organosilanes having a functional group in a position to the silane group, especially N-(methyldimethoxysilylmethyl)-O-methylcarbamate or (methacryloyloxymethyl)silanes, methoxymethylsilanes, orthoformic esters, and also calcium oxide or molecular sieves.

The composition more preferably comprises vinyltrimethoxysilane or vinyltriethoxysilane. Preference is given here to vinyltrimethoxysilane if the polymer containing silane groups has methoxysilane groups, while vinyltriethoxysilane is preferred if the polymer containing silane groups has ethoxysilane groups.

The drier is suitably in the same component as the polymer containing silane groups.

Suitable accelerators are especially substances that accelerate the crosslinking of polymers containing silane groups. Particularly suitable for this purpose are metal catalysts and/or nitrogen-containing compounds.

Suitable metal catalysts are compounds of titanium, zirconium, aluminum, or tin, especially organotin compounds, organotitanates, organozirconates or organoaluminates, these metal catalysts especially having alkoxy groups, aminoalkoxy groups, sulfonate groups, carboxyl groups, 1,3-diketonate groups, 1,3-ketoesterate groups, dialkyl phosphate groups or dialkyl pyrophosphate groups. The following are particularly suitable: dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate or dioctyltin diacetylacetonate, and organotitanates or organozirconates.

Suitable nitrogen-containing compounds are especially amidines such as 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene, or guanidines such as tetramethylguanidine, 2-guanidinobenzimidazole, acetylacetoneguanidine or reaction products of carbodiimides and amines such as, in particular, polyetheramines or aminosilanes.

Suitable accelerators are also especially substances that accelerate the reaction of epoxy groups with amino groups. This purpose is served especially by acids or compounds that are hydrolyzable to acids, especially organic carboxylic acids such as salicylic acid, organic sulfonic acids such as p-toluenesulfonic acid, sulfonic esters, phosphoric acid, or nitrates such as, in particular, calcium nitrate, or tertiary amines such as, in particular, 1,4-diazabicyclo[2.2.2]octane, triethanolamine, imidazoles such as, in particular, N-methylimidazole, N-vinylimidazole or 1,2-dimethylimidazole, the recited amidines or guanidines, phenols or Mannich bases such as, in particular, 2,4,6-tris(dimethylaminomethyl)phenol, or compounds having mercapto groups.

The composition preferably comprises at least one accelerator selected from dialkyltin compounds, organotitanates, amidines, guanidines, acids, calcium nitrate and Mannich bases.

More preferably, the composition comprises 2,4,6-tris(dimethylaminomethyl)phenol and at least one further accelerator.

In a preferred embodiment of the invention, the composition comprises water or a water-releasing substance. A composition of this kind has the advantage that only some, if any, of the water needed for the crosslinking of the silane groups has to be taken up from the environment.

The composition preferably contains a total of up to 5% by weight, especially up to 2% by weight, of free or releasable water.

Free water is suitably not in the same component as the polymer containing silane groups.

Suitable fillers are especially ground or precipitated calcium carbonates, optionally coated with fatty acids, especially stearates, barytes, quartz flours, quartz sands, dolomites, wollastonites, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or lightweight fillers such as hollow glass beads or gas-filled plastic spheres (microspheres), especially the types obtainable under the Expancel® brand name (from Akzo Nobel).

Preference is given to calcium carbonates, calcined kaolins, finely divided silicas or industrially produced carbon blacks.

Suitable plasticizers are especially carboxylic esters, such as phthalates, especially diisononyl phthalate (DINP), diisodecyl phthalate (DIDP) or di(2-propylheptyl) phthalate (DPHP), hydrogenated phthalates or cyclohexane-1,2-dicarboxylates, especially hydrogenated diisononyl phthalate or diisononyl cyclohexane-1,2-dicarboxylate (DINCH), terephthalates, especially bis(2-ethylhexyl) terephthalate (DOTP) or diisononyl terephthalate (DINT), hydrogenated terephthalates or cyclohexane-1,4-dicarboxylates, especially hydrogenated bis(2-ethylhexyl) terephthalate or bis(2-ethylhexyl) cyclohexane-1,4-dicarboxylate, or hydrogenated diisononyl terephthalate or diisononyl cyclohexane-1,4-dicarboxylate, isophthalates, trimellitates, adipates, especially dioctyl adipate, azelates, sebacates, benzoates, glycol ethers, glycol esters such as, in particular, triethylene glycol bis(2-ethylhexanoate), plasticizers having polyether structure, especially polypropylene oxide monools, diols or triols having blocked hydroxyl groups, especially in the form of acetate groups, organic phosphoric or sulfonic esters, polybutenes, polyisobutenes or plasticizers derived from natural fats or oils, especially epoxidized soybean or linseed oil.

Preferred plasticizers are phthalates, glycol esters or plasticizers having polyether structure.

The composition of the invention may contain further additions, especially further crosslinkers, especially further silanes such as epoxysilanes or mercaptosilanes, or compounds having mercapto groups, for example mercaptan-terminated polysulfide polymers or mercaptan-terminated polyoxyalkylene ethers;

solvents or diluents;

inorganic or organic pigments, especially titanium dioxide, chromium oxides or iron oxides;

dyes;

rheology modifiers, especially thickeners, especially sheet silicates such as bentonites, derivatives of castor oil, hydrogenated castor oil, polyamides, polyurethanes, urea compounds, polyvinylchlorides, fumed silicas, cellulose ethers or hydrophobically modified polyoxyethylenes;

natural resins, fats or oils, such as rosin, shellac, linseed oil, castor oil or soybean oil;

nonreactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene/vinyl acetate copolymers (EVA) or atactic poly-α-olefins (APAO);

fibers, especially glass fibers, carbon fibers, metal fibers, ceramic fibers, polymer fibers such as polyamide fibers or polyethylene fibers, or natural fibers such as wool, cellulose, hemp or sisal;

nanofillers such as graphene or carbon nanotubes;

flame-retardant substances, especially the aluminum hydroxide or magnesium hydroxide fillers already mentioned, and also especially organic phosphoric esters, such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris (isopropylphenyl) phosphates of different degrees of isopropylation, resorcinol bis(diphenylphosphate), bisphenol A bis(diphenylphosphate) or ammonium polyphosphates;

additives, especially emulsifiers, wetting agents, leveling agents, defoamers, deaerators, stabilizers against oxidation, heat, light or UV radiation, or biocides.

It may be advisable to dry certain constituents chemically or physically before mixing them into the composition, particularly if they are being stored together with the polymer containing silane groups.

Preferably, the composition of the invention contains little solvent. It especially contains less than 5% by weight, preferably less than 2.5% by weight, of solvent. Most preferably, it is essentially free of solvents.

The composition of the invention preferably has a content of polymer containing silane groups in the range from 10% to 50% by weight, especially 12% to 40% by weight.

The composition of the invention preferably has a liquid epoxy resin content in the range from 10% to 60% by weight, especially 20% to 50% by weight.

The composition of the invention preferably has a total content of liquid epoxy resin and reactive diluent containing epoxy groups in the range from 20% to 70% by weight, especially 25% to 65% by weight.

The composition of the invention preferably contains
12% to 40% by weight of polymer containing silane groups,
20% to 50% by weight of liquid epoxy resin,
0% to 20% by weight of reactive diluent containing epoxy groups,
5% to 40% by weight of polyamines,
0% to 50% by weight of fillers,
and optionally further ingredients.

The composition of the invention is preferably produced and used as a two-component composition. The first and second components of the composition are produced separately from one another and stored in a moisture-tight container. A suitable container is especially a drum, a hobbock, a pouch, a bucket, a can, a cartridge or a tube.

For the use of the composition described, the two components are mixed with one another shortly before or during the application. The mixing ratio is selected preferably such that the groups reactive toward epoxy groups are present in a suitable ratio to the epoxy groups, as described above. In parts by weight, the mixing ratio is typically in the range from 1:10 to 10:1.

The two components are mixed by a suitable method; mixing can be effected continuously or batchwise, using a static mixer or by means of a dynamic mixer. If the mixing precedes the application, care must be taken to ensure that application takes place within the pot life of the composition, since otherwise there may be disruptions, such as retarded or incomplete development of adhesion to the substrate or premature gelling, for example.

The "pot life" refers to the time within which the composition should be applied after the components have been mixed.

The components are preferably mixed at ambient temperature, which is typically in the range from about 0 to 50° C., preferably about 5 to 35° C.

Curing by chemical reaction begins with the mixing of the two components. Epoxy groups react here with amine hydrogens, and silane groups undergo hydrolysis with release of alcohol, forming silanol groups (Si—OH groups) and, through subsequent condensation reactions, siloxane groups (Si—O—Si groups). As a result of these and possibly further reactions, the composition cures to give a crosslinked polymer. If the water for hydrolysis of the silane groups was not already present in the composition, it may come from the air (atmospheric humidity) or from a substrate, or the composition may be contacted, by coating, spraying or mixed incorporation, for example, with a water-containing component.

The curing especially proceeds at a temperature in the range from 0 to 150° C. It can especially be effected at ambient temperature, and typically extends over a few days to weeks until it is largely at an end under the prevailing conditions. In certain cases, it may be advantageous to subject a composition partly cured at ambient temperature to further curing at an elevated temperature.

The composition described is applied to at least one substrate, the following substrates being particularly suitable:

metals or alloys such as aluminum, iron, steel, copper, other nonferrous metals, including surface-upgraded metals or alloys such as galvanized or chrome-plated metals;
concrete, mortar, cement screed, fiber cement, brick, tile, gypsum and natural rocks such as granite or marble;
asphalt or bitumen;
coated or painted substrates, especially painted tiles, coated concrete, powder-coated metals or alloys or painted metal sheets;
repair or leveling compounds based on PCC (polymer-modified cement mortar) or ECC (epoxy resin-modified cement mortar);
leather, textiles, paper, wood, woodbase materials bonded with resins, e.g. phenolic, melamine or epoxy resins, resin-textile composites or further so-called polymer composites;
plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;
fiber-reinforced plastics, such as carbon fiber-reinforced plastics (CFP), glass fiber-reinforced plastics (GFP) and sheet molding compounds (SMC);
glass or glass ceramic;
insulation foams, especially made of EPS, XPS, PUR, PIR, rock wool, glass wool or foamed glass.

If required, the substrates can be pretreated prior to application, especially by physical and/or chemical cleaning methods or the application of an activator or a primer.

The curing of the composition described affords a cured composition.

The cured composition has a very high strength, high extensibility and high tear resistance.

More particularly, it has a tensile strength of at least 15 MPa, preferably at least 20 MPa, and an elongation at break of at least 10%, preferably at least 15%, especially at least 20%, most preferably at least 25%, determined on dumbbell-shaped test specimens having a length of 75 mm, bar length of 30 mm, bar width of 4 mm and thickness of about 2 mm, described in accordance with DIN EN 53504 at a strain rate of 2 mm/min.

More particularly, it has a tear resistance of at least 10 N/mm, preferably at least 15 N/mm, especially at least 20 N/mm, determined in accordance with DIN ISO 34 at a strain rate of 500 mm/min.

The composition also has high stability to heat, light and hydrolysis. More particularly, the composition also has a high stability toward glycol/water mixtures as used as cooling fluid or antifreeze in automobiles or batteries of electrical vehicles, for example a mixture of 50% by weight of Glysantin® G64® concentrate (from BASF) and 50% by weight of water.

Moreover, the composition has very high bonding forces to various substrates, especially also to wet or moist substrates. More particularly, metals such as aluminum or steel can be bonded with the composition of the invention without primer, the bond being very resistant to corrosion, for example in the case of saltwater stress. Moreover, it is possible to permanently bond concrete, asphalt or bitumen without primer, even under moist or wet conditions.

Moreover, the composition has anticorrosive action when used on metals such as aluminum or steel.

The composition is also advantageous especially when isocyanate-free products are to be used for reasons of occupational and health protection.

The composition described is preferably used as adhesive, sealant, coating or casting compound, especially on at least one metal such as, in particular, steel or aluminum, preferably aluminum.

In the case of use on at least one metal, there is the advantage that the metal is protected from corrosion by the composition. Thus, adhesion is not weakened by metal corrosion even in the case of stress with saltwater, for example. More particularly, it is possible to bond uneloxed aluminum without using a primer, without weakening of adhesion by corrosion even in the case of saltwater stress.

The composition described is more preferably used as viscoelastic adhesive. In this case, after the components have been mixed, it typically has a liquid or pasty consistency with structurally viscous properties. On application, the mixed adhesive is applied within the pot life to at least one of the substrates to be bonded and the substrates are joined to form an adhesive bond within the open time of the adhesive.

"Open time" of an adhesive refers to the maximum time span possible for a cohesive bond between the application of the adhesive and the joining of the parts to be bonded.

The mixed adhesive is applied especially by means of a brush, roll, spatula, doctor blade or trowel, or from a tube, cartridge or metering device.

The adhesive is particularly suitable for uses in the construction industry or for the bonding of components in the manufacturing industry.

A preferred use is the bonding of battery boxes, especially of electrical vehicles.

An advantageous feature here is high strength coupled with high extensibility, high bonding force and high stability, especially also with respect to glycol/water mixtures as used as cooling fluid for such batteries. Components bonded here are especially those made of aluminum, particularly advantageously with corrosion-resistant adhesion under saltwater stress.

The invention thus further provides a method of bonding, characterized in that the mixed composition is applied to at least one of the substrates to be bonded within the pot life, and the substrates are joined to give a bond within the open time, followed by the curing of the mixed composition. At least one of the substrates here is preferably a metal, especially aluminum or steel, more preferably aluminum.

The composition described is preferably also used as coating, especially as coating for metals such as, in particular, steel or aluminum, where the composition protects the metal from corrosion.

The composition described is preferably also used as casting compound for the filling of cavities such as cracks, gaps or drillholes, wherein the mixed composition is filled or injected into the cavity and fills it after curing, and bonds the flanks of the cavity to one another in a viscoelastic manner, giving excellent adhesion even on a wet substrate. It is thus possible in a simple manner to permanently repair roads, squares or terraces with damage on their surface or at curbs, edges or boundaries, and walls or other built structures, with the repaired sites being very stable even to severe stresses.

If desired, in the filling of cavities, it is possible to introduce what is called anchor into the cavity, for example a reinforcement rod, a threaded rod or a bolt.

The invention thus further provides a method of coating substrates or of filling cavities, especially cracks or gaps, characterized in that the mixed composition is applied to a substrate or used to fill a cavity within the pot life, and cures in situ. In the filling of cavities, it is optionally possible to insert an anchor into the cavity while the composition is still free-flowing.

The application and curing of the composition described, or the method of bonding or the method of coating substrates or of filling cavities, affords an article. This article may be a built structure or part thereof, especially a road, a square, a terrace, a kerbstone, an edging, a boundary or a wall, or it may be an industrial good or consumer good, especially a motor vehicle or part thereof, especially the box of a motor vehicle battery.

The invention thus further provides an article obtained from the described use or the described method of bonding or filling cavities.

The composition of the invention has advantageous properties, especially good storage stability, rapid curing, even under wet or moist conditions, surprisingly high strength coupled with high extensibility, high tear resistance, high stability and high bonding forces on many substrates, with the composition protecting metals such as steel or aluminum from corrosion when used thereon. The composition thus enables reliable bonding of untreated aluminum under corrosive conditions.

EXAMPLES

Working examples are adduced hereinafter, which are intended to elucidate the invention described. The invention is of course not limited to these described working examples.

"Standard climatic conditions" ("SCC") refer to a temperature of 23±1° C. and a relative air humidity of 50±5%.

Unless otherwise stated, the chemicals used were from Sigma-Aldrich Chemie GmbH.

Diethyl N-(3-trimethoxysilylpropyl)aminosuccinate was prepared from the reaction of diethyl maleate and 3-trimethoxysilylpropylamine.

Diisodecyl phthalate was used in the form of Palatinol® 10-P (from BASF).

Comparative examples are identified by (Ref.).

Preparation of Polymers Containing Silane Groups:

Polymer ST-1

With exclusion of moisture, 400 g of polyoxypropylene diol (Acclaim® 4200, OH number 28 mg KOH/g, from Covestro) and 52 g of diphenylmethane 4,4'-diisocyanate (Desmodur® 44 MC L, from Covestro) were heated to 80° C. with constant stirring and left at that temperature until the NCO content reached a value of 1.85% by weight.

Subsequently, 70.7 g of diethyl N-(3-trimethoxysilylpropyl)aminosuccinate was added and the mixture was stirred at 60° C. until it was no longer possible to detect any isocyanate by means of FT-IR spectroscopy. The resultant polymer containing silane groups was cooled down to room temperature and stored with exclusion of moisture. It was clear and liquid at room temperature, and had a calculated silicon content of 1.08% by weight.

Polymer ST-2

With exclusion of moisture, 513.3 g of polyoxypropylene diol (Acclaim® 4200, OH number 28 mg KOH/g, from Covestro), 256.7 g of ethylene oxide-terminated polyoxypropylene triol (Caradol® MD34-02, OH number 35 mg KOH/g, from Shell) and 64.2 g of toluene diisocyanate (Desmodur® T 80 P, from Covestro) were heated to 80° C. with constant stirring and left at that temperature until the NCO content reached a value of 1.5% by weight.

Subsequently, 105.8 g of diethyl N-(3-trimethoxysilylpropyl)aminosuccinate was added and the mixture was stirred at 60° C. until it was no longer possible to detect any isocyanate by means of FT-IR spectroscopy. The resultant polymer containing silane groups was cooled down to room temperature and stored with exclusion of moisture. It was clear and liquid at room temperature, and had a calculated silicon content of 0.90% by weight.

Polymer ST-3

With exclusion of moisture, 400 g of polyoxypropylene diol (Acclaim® 4200, OH number 28 mg KOH/g, from Covestro), 44.4 g of isophorone diisocyanate (Vestanat® IPDI, from Evonik) and 0.05 g of dibutyltin dilaurate were heated to 80° C. with constant stirring and left at that temperature until the NCO content reached a value of 1.9% by weight.

Subsequently, 74.8 g of diethyl N-(3-trimethoxysilylpropyl)aminosuccinate was added and the mixture was stirred at 60° C. until it was no longer possible to detect any isocyanate by means of FT-IR spectroscopy. The resultant polymer containing silane groups was cooled down to room temperature and stored with exclusion of moisture. It was clear and liquid at room temperature, and had a calculated silicon content of 1.15% by weight.

Polymer ST-4

With exclusion of moisture, 500.0 g of polyoxypropylene diol (Voranol® 2000 L, OH number 55.5 mg KOH/g, from Dow) and 88.7 g of toluene diisocyanate (Desmodur® T 80 P, from Covestro) were heated to 80° C. with constant stirring and left at that temperature until the NCO content reached a value of 3.4% by weight.

Subsequently, 167.5 g of diethyl N-(3-trimethoxysilylpropyl)aminosuccinate was added and the mixture was stirred at 60° C. until it was no longer possible to detect any isocyanate by means of FT-IR spectroscopy. The resultant polymer containing silane groups was cooled down to room temperature and stored with exclusion of moisture. It was clear and liquid at room temperature, and had a calculated silicon content of 1.8% by weight.

Polymer ST-5 (Ref.)

With exclusion of moisture, 250.0 g of polyoxypropylene diol (Voranol® 2000 L, OH number 55.5 mg KOH/g, from Dow), 250.0 g of polyoxypropylene diol (Voranol® P1010, OH number 110 mg KOH/g, from Dow) and 130.4 g of toluene diisocyanate (Desmodur® T 80 P, from Covestro) were heated to 80° C. with constant stirring and left at that temperature until the NCO content reached a value of 4.9% by weight.

Subsequently, 258.5 g of diethyl N-(3-trimethoxysilylpropyl)aminosuccinate was added and the mixture was stirred at 60° C. until it was no longer possible to detect any isocyanate by means of FT-IR spectroscopy. The resultant polymer containing silane groups was cooled down to room temperature and stored with exclusion of moisture. It was clear and liquid at room temperature, and had a calculated silicon content of 2.3% by weight.

Polymer ST-6 (Ref.)

With exclusion of moisture, 1000 g of polyoxypropylene diol (Acclaim® 12200, from Covestro; OH number 11.0 mg KOH/g), 122.8 g of diisodecyl phthalate, 43.6 g of isophorone diisocyanate (Vestanat® IPDI, from Evonik) and 0.12 g of dibutyltin dilaurate were heated to 90° C. with constant stirring and left at that temperature until the NCO content reached a value of 0.63% by weight.

Subsequently, 61.8 g of diethyl N-(3-trimethoxysilylpropyl)aminosuccinate was added and the mixture was stirred at 90° C. until it was no longer possible to detect any isocyanate by means of FT-IR spectroscopy. The resultant polymer containing silane groups (90% by weight in diisodecyl phthalate) was cooled down to room temperature and stored with exclusion of moisture. It was clear and liquid at room temperature, and had a calculated silicon content of 0.45% by weight (calculated for 100% by weight of polymer, without diisodecyl phthalate).

Polymers ST-1 to ST-4 have a silicon content according to the invention. Polymer ST-5 (Ref.) has a higher content and polymer ST-6 (Ref.) a lower content than the silicon content according to the invention. They serve as comparison.

Production of Two-Component Compositions:

Examples Z-1 to Z-7

For each composition, the ingredients specified in table 1 were mixed in the specified amounts (in parts by weight) of component 1 by means of a centrifugal mixer (SpeedMixer™ DAC 150, FlackTek Inc.) and stored with exclusion of moisture.

Similarly, the ingredients of component 2 specified in table 1 were processed and stored.

The two components of each composition were then processed by means of the centrifugal mixer in the specified mixing ratio (0.6/1 by weight) to give a homogeneous liquid and this was tested immediately as follows:

For the determination of pot life, an amount of 300 g of the freshly mixed composition was stirred in a 500 ml beaker with a spatula at intervals of 5 minutes until it felt as if the composition had thickened to such an extent that it would no longer have good workability.

For determination of the mechanical properties, the mixed composition was poured onto a PTFE-coated film to give a film of thickness 2 mm and stored under standard climatic conditions. After 1 day, a number of dumbbell-shaped test specimens having a length of 75 mm with a bar length of 30 mm and a bar width of 4 mm were punched out of the film and stored under standard climatic conditions for a further 6 days. Subsequently, these, as described in DIN EN 53504, at a strain rate of 2 mm/min, tensile strength (breaking force), elongation at break and modulus of elasticity at 0.5% to 1% elongation (MoE 0.5-1%) and at 0.5% to 5% elongation (MoE 0.5-5%) were determined. Similarly, a number of test specimens were punched out and stored for determination of tear resistance and were tested in accordance with DIN ISO 34 at a strain rate of 500 mm/min.

After 7 days under SCC, the appearance of all the films was rated visually. All films were black in color after curing, had absolutely zero tack with a silky matt surface, and were homogeneous and free of blisters. Such films were referred to as "nice".

These results are reported in table 2.

Examples Z-1 to Z-3 and Z-5 to Z-6 are inventive examples in which the polymer containing silane groups has a silicon content according to the invention. Example Z-4 is a comparative example in which the polymer containing silane groups has a lower content than the silicon content of the invention. Example Z-7 is a comparative example in which the polymer containing silane groups has a higher content than the silicon content of the invention.

TABLE 1

Composition of examples Z-1 to Z-7.

| | Example | | | | | | |
|---|---|---|---|---|---|---|---|
| | Z-1 | Z-2 | Z-3 | Z-4 (Ref.) | Z-5 | Z-6 | Z-7 (Ref.) |
| Component 1: | | | | | | | |
| Polymer | ST-1 | ST-1 | ST-2 | ST-6 | ST-3 | ST-4 | ST-5 |
| | 62.2 | 56.0 | 62.2 | 62.2 | 62.2 | 62.2 | 62.2 |
| Diisodecyl phthalate | 1.4 | 7.6 | 1.4 | 1.4 | 1.4 | 1.4 | 1.4 |
| Vinyltrimethoxysilane | 2.4 | 2.4 | 2.4 | 2.4 | 2.4 | 2.4 | 2.4 |
| 1,2-Diaminocyclohexane[1] | 27.4 | 27.4 | 27.4 | 27.4 | 27.4 | 27.4 | 27.4 |
| Silquest® A-1110[2] | 2.3 | 2.3 | 2.3 | 2.3 | 2.3 | 2.3 | 2.3 |
| Ancamine® K54[3] | 2.3 | 2.3 | 2.3 | 2.3 | 2.3 | 2.3 | 2.3 |
| Stabilizer[4] | 0.4 | 0.4 | 0.4 | 0.4 | 0.4 | 0.4 | 0.4 |
| Carbon black | 1.5 | 1.5 | 1.5 | 1.5 | 1.5 | 1.5 | 1.5 |
| Dibutyltin dilaurate | 0.1 | 0.1 | 0.1 | 0.1 | 0.1 | 0.1 | 0.1 |
| Component 2: | | | | | | | |
| Bisphenol A diglycidyl ether[5] | 70.2 | 70.2 | 70.2 | 70.2 | 70.2 | 70.2 | 70.2 |
| Hexanediol diglycidyl ether[6] | 23.4 | 23.4 | 23.4 | 23.4 | 23.4 | 23.4 | 23.4 |
| Emulsifier | 0.5 | 0.5 | 0.5 | 0.5 | 0.5 | 0.5 | 0.5 |
| Water | 1.9 | 1.9 | 1.9 | 1.9 | 1.9 | 1.9 | 1.9 |
| Fumed silica | 2.4 | 2.4 | 2.4 | 2.4 | 2.4 | 2.4 | 2.4 |
| Carbon black | 1.5 | 1.5 | 1.5 | 1.5 | 1.5 | 1.5 | 1.5 |
| Dibutyltin dilaurate | 0.1 | 0.1 | 0.1 | 0.1 | 0.1 | 0.1 | 0.1 |
| Mixing ratio[7] | 0.6/1 | 0.6/1 | 0.6/1 | 0.6/1 | 0.6/1 | 0.6/1 | 0.6/1 |

[1]Dytek® DCH-99 (from Invista)
[2]3-aminopropyltrimethoxysilane (from Momentive)
[3]2,4,6-tris(dimethylaminomethyl)phenol (from Evonik)
[4]Irganox 1010 (from BASF)
[5]Araldite® GY 250 (from Huntsman)
[6]Araldite® DY-H (from Huntsman)
[7]ratio of component 1/component 2 in parts by weight

TABLE 2

Properties of examples Z-1 to Z-7.

| | Example | | | | | | |
|---|---|---|---|---|---|---|---|
| | Z-1 | Z-2 | Z-3 | Z-4 (Ref.) | Z-5 | Z-6 | Z-7 (Ref.) |
| Silicon content of the polymer containing silane groups [% by wt.] | 1.08 | 1.08 | 0.90 | 0.45 | 1.15 | 1.8 | 2.3 |
| Diisocyanate in the polymer | MDI | MDI | TDI | IPDI | IPDI | TDI | TDI |
| Pot life [min] | 30 | 30 | 30 | 30 | 30 | 30 | 30 |
| Tensile strength [MPa] | 23.6 | 25.2 | 25.1 | 8.8 | 19.5 | 21.0 | 20.3 |
| Elongation at break | 38% | 27% | 41% | 35% | 43% | 58% | 36% |
| MoE 0.5-1% [MPa] | 1127 | 1174 | 1059 | 80 | 735 | 892 | 877 |
| MoE 0.5-5% [MPa] | 353 | 385 | 386 | 57 | 263 | 307 | 317 |
| Tear resistance [N/mm] | 27.5 | 27.9 | 29.6 | 9.4 | 23.9 | 19.7 | 17.5 |
| Appearance | nice | nice | nice | nice | nice | nice | nice |

In addition, the corrosion resistance or stability of a bond of two aluminum sheets (5754 alloy, AlMg3, bright) was tested with the composition from example Z-1 under saltwater stress. As a comparison, the same tests were conducted with a commercial two-component epoxy resin adhesive (2K epoxy adhesive) (=impact-resistant structural adhesive 07333, from 3M).

For this purpose, multiple bonded test specimens were produced by applying the freshly mixed adhesive between two bright, heptane-degreased aluminum sheets (AlMg3, 100×25×1 mm) in a layer thickness of 0.3 mm with an overlapping bond area of 10×25 mm. After a storage time of 7 days under standard climatic conditions, lap shear strength was determined to DIN EN 1465 at a strain rate of 10 mm/min. This value is reported in table 3 as 0 weeks (starting value).

Further test specimens of this kind were subjected to various cycles with saltwater stress, as described hereinafter. On the first day, the test specimens were placed into a salt solution (5% by weight of NaCl in deionized water) at room temperature for 15 min, then suspended and allowed to drip dry under standard climatic conditions for 95 min, followed by storage in a climate-controlled cabinet at 50° C./90% relative humidity for 22 h (=1 cycle). This was followed by a further 4 days with the same sequence, followed by 48 h in a climate-controlled cabinet at 50° C./90% relative humidity (weekend). This results in a storage time of 1 week with 5 cycles of saltwater stress. The test specimens were stored in this way for 2 weeks (10 cycles) or 4 weeks (20 cycles) or 6 weeks (30 cycles), and then the lap shear strength was determined in each case as described above. On completion of lap shear strength testing, the test specimens were assessed visually with regard to the fracture profile and the condition of the aluminum sheet under the bond (Appearance). "cf" means cohesive failure; "af" means adhesive failure. "No corrosion" means that the aluminum sheet has unchanged shine beneath the bond. "2-3 mm corrosion" means that the aluminum has a matt white color within a range of 2-3 mm from the edges beneath the bond. In the region not covered by the bond, all sheets have a spotty matt white appearance after saltwater stress.

These results are reported in table 3.

TABLE 3

Lap shear strength and appearance after saltwater stress of example Z-1 compared to a 2K epoxy adhesive (07333, from 3M)

| | Example Z-1 | 2K epoxy adhesive (Ref.) |
|---|---|---|
| 0 weeks | 13.9 MPa 25% cf/75% af, no corrosion | 10.5 MPa 100% af, 2-3 mm corrosion |
| 2 weeks (10 cycles) | 13.8 MPa 25% cf/75% af, no corrosion | 7.9 MPa 100% af, 2-3 mm corrosion |
| 4 weeks (20 cycles) | 12.3 MPa 25% cf/75% af, 0-1 mm corrosion | 6.3 MPa 100% af, 2-3 mm corrosion |
| 6 weeks (30 cycles) | 12.1 MPa 25% cf/75% af, 2-3 mm corrosion | 5.2 MPa 100% af, 2-3 mm corrosion |

Adhesion on dry and wet concrete and bitumen was also determined for the composition from example Z-1. For this purpose, 3 concrete slabs (500×500×40 mm) and 3 bitumen slabs (about 300×200×30 mm) were provided. Two slabs were each coated in the dry state with the freshly mixed composition in a layer thickness of about 3 to 4 mm. The third slab was placed into deionized water for 24 h and then, in the wet state with residues of standing water on the surface, likewise coated with the freshly mixed composition in a layer thickness of about 3 to 4 mm. Several acetone-cleaned steel cylinders having a diameter of 20 mm were applied to each of the freshly coated slabs, such that a bond was formed between the steel cylinders and the composition (coating). After a storage time of the coated slabs of 7 days under standard climatic conditions, the bond strength value was determined in each case on one of the two dry slabs and on the wet slab. The further slab coated in the dry state was placed into deionized water for 7 days, the surface was dried, and only then was the bond strength value determined. The value for bond strength was determined in each case by pulling on the bonded steel cylinder according to DIN EN 4624 at a testing speed of 2 mm/min until it broke away from the slab.

These results are reported in table 4.

TABLE 4

Bond strength results for the composition from example Z-1 on concrete and bitumen

| | dry | wet | dry + water for 7 d |
|---|---|---|---|
| Concrete bond strength [MPa] Fracture profile | 6.54 100% substrate fracture | 6.62 100% substrate fracture | 6.43 100% substrate fracture |
| Bitumen bond strength [MPa] Fracture profile | 2.35 100% substrate fracture | 2.15 100% substrate fracture | 2.45 100% substrate fracture |

The invention claimed is:
1. A composition comprising
at least one polymer containing silane groups and having a silicon content in the range from 0.9 to 1.8% by weight, obtained from the reaction of at least one polymer containing isocyanate groups and at least one amino-silane, wherein the polymer containing isocyanate groups has been obtained from a reaction of at least one polyoxypropylene diol and at least one diisocyanate, at least one liquid epoxy resin, and
at least one polyamine having at least three amine hydrogens reactive toward epoxy groups.

2. The composition as claimed in claim 1, wherein the polymer containing silane groups has a silicon content in the range from 0.9% to 1.5% by weight.

3. The composition as claimed in claim 1, wherein the polymer containing silane groups has silane groups of the formula (I)

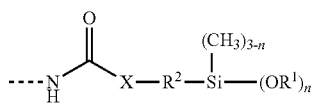

where
n is 1 or 2 or 3,
$R^1$ is a linear or branched, monovalent hydrocarbyl radical having 1 to 5 carbon atoms,
$R^2$ is a linear or branched, divalent hydrocarbyl radical which has 1 to 12 carbon atoms and which optionally contains cyclic and/or aromatic moieties and optionally one or more heteroatoms,
X is O or S or $NR^3$ where $R^3$ is a hydrogen atom or a linear or branched hydrocarbyl radical which has 1 to 20 carbon atoms and which optionally contains cyclic moieties, and which optionally contains an alkoxysilyl group or ether or carboxylic ester groups.

4. The composition as claimed in claim 1, wherein the polymer containing isocyanate groups has an NCO content in the range from 1.2% to 4% by weight.

5. The composition as claimed in claim 1, wherein the polymer containing isocyanate groups has been obtained from the reaction of at least one polyoxypropylene diol having an OH number in the range from 18 to 58 mg KOH/g, and optionally having terminal oxyethylene groups, and at least one diisocyanate.

6. The composition as claimed in claim 1, wherein the polymer containing isocyanate groups has aromatic isocyanate groups.

7. The composition as claimed in claim 1, wherein the polyamine is selected from the group consisting of 1,5-diamino-2-methylpentane, 2,2 (4),4-trimethylhexamethylenediamine, 1,2-diaminocyclohexane, 1,3-diaminocyclohexane, 1,4-diaminocyclohexane, 1,3-bis(aminomethyl)cyclohexane, 1,4-bis(aminomethyl)cyclohexane, 1-amino-3-aminomethyl-3,5,5-trimethylcyclohexane, 2(4)-methyl-1,3-diaminocyclohexane, bis(4-aminocyclohexyl) methane, 2,5(2,6)-bis(aminomethyl) bicyclo[2.2.1]heptane, 1,3-bis(aminomethyl)benzene, polyoxypropylenediamines and polyoxypropylenetriamines with average molecular weight $M_n$ in the range from 200 to 500 g/mol, bis(hexamethylene)triamine, triethylenetetramine, tetraethylenepentamine, N,N'-bis(3-aminopropyl)ethylenediamine, N,N-dimethyldi(1,3-propylene)triamine, N-benzylethane-1,2-diamine, N-benzylpropane-1,2-diamine, N-benzyl-1,3-bis(aminomethyl)benzene, N-(2-phenylethyl)-1,3-bis(aminomethyl)benzene and the adduct of 1,5-diamino-2-methylpentane or propane-1,2-diamine with cresyl glycidyl ether.

8. The composition as claimed in claim 1, wherein it comprises a first component and a second component that are produced, packed and stored separately, wherein the polyamine is not in the same component as the liquid epoxy resin.

9. The composition as claimed in claim 1, wherein it additionally comprises at least one further constituent selected from aminosilanes, driers, accelerators, water, fillers and plasticizers.

10. A method comprising applying the composition as claimed in claim 1 as adhesive, sealant, coating or casting compound.

11. The method as claimed in claim 10, wherein the composition is used for the bonding of battery boxes.

12. A method of bonding, wherein the mixed composition as claimed in claim 1 is applied to at least one of the substrates to be bonded within the pot life, and the substrates are joined to give a bond within the open time, followed by the curing of the mixed composition.

13. A method of coating substrates or of filling cavities, wherein the mixed composition as claimed in claim 1 is applied to a substrate or used to fill a cavity within the pot life, and cures in situ.

14. An article obtained from the method of claim 10.

* * * * *